(12) United States Patent
Weiland et al.

(10) Patent No.: US 8,341,192 B2
(45) Date of Patent: Dec. 25, 2012

(54) NAVIGATION SYSTEM AND METHODS REGARDING DISPUTED TERRITORIES

(75) Inventors: Michael L. Weiland, Gurnee, IL (US); Jeffrey Painter, Sugar Grove, IL (US); Michael P. Dembski, Elmhurst, IL (US); Bart Tielens, Geldermalsen (NL)

(73) Assignee: Navteq B.V., Veldhoven (NL)

( * ) Notice: Subject to any disclaimer, the term of this patent is extended or adjusted under 35 U.S.C. 154(b) by 301 days.

(21) Appl. No.: 12/559,723

(22) Filed: Sep. 15, 2009

(65) Prior Publication Data

US 2011/0066657 A1 Mar. 17, 2011

(51) Int. Cl.
G06F 17/30 (2006.01)

(52) U.S. Cl. .................. 707/803; 707/532; 707/208

(58) Field of Classification Search .................. 701/207, 701/208, 200, 532; 707/803
See application file for complete search history.

(56) References Cited

U.S. PATENT DOCUMENTS

| | | | |
|---|---|---|---|
| 6,081,803 A | 6/2000 | Ashby et al. | |
| 6,247,019 B1 * | 6/2001 | Davies | 1/1 |
| 6,324,404 B1 | 11/2001 | Dennison et al. | |
| 6,604,083 B1 * | 8/2003 | Bailey | 705/7.34 |
| 6,708,112 B1 | 3/2004 | Beesley et al. | |
| 6,847,822 B1 * | 1/2005 | Dennison et al. | 455/456.1 |
| 6,976,027 B2 * | 12/2005 | Cutlip | 711/216 |
| 7,164,986 B2 * | 1/2007 | Humphries et al. | 701/207 |
| 7,289,763 B2 * | 10/2007 | Dennison et al. | 455/12.1 |
| 2005/0060400 A1 * | 3/2005 | Mannepalli et al. | 709/223 |
| 2005/0159883 A1 * | 7/2005 | Humphries et al. | 701/207 |
| 2007/0135991 A1 * | 6/2007 | Riise et al. | 701/207 |
| 2007/0135992 A1 * | 6/2007 | Riise et al. | 701/207 |
| 2007/0135993 A1 * | 6/2007 | Riise et al. | 701/207 |
| 2008/0014965 A1 * | 1/2008 | Dennison et al. | 455/456.1 |
| 2009/0247117 A1 * | 10/2009 | Dennison et al. | 455/404.2 |
| 2010/0217521 A1 * | 8/2010 | Tysowski | 701/208 |
| 2011/0066371 A1 * | 3/2011 | Weiland et al. | 701/208 |

* cited by examiner

*Primary Examiner* — Jean M Corrielus

(57) ABSTRACT

Systems, devices, features, and methods for collecting or storing data corresponding to disputed territories for a geographic database, such as for use with a navigation system, are disclosed. For example, one method comprises identifying a data record that represents a geographic feature of a disputed area. An indication of dispute may be assigned to the identified data record, in which the indication of dispute represents that the identified data record corresponds to a feature in dispute between multiple geographic entities. Another data record that represents a geographic feature in dispute may also be identified. The indication of dispute and/or the data records of the features may be stored in a geographic database.

21 Claims, 6 Drawing Sheets

NAVIGATION SYSTEM AND METHODS REGARDING DISPUTED TERRITORIES

REFERENCE TO RELATED APPLICATIONS

The present patent application is related to the copending patent application filed on the same date, Ser. No. 12/559,752, entitled "NAVIGATION SYSTEM AND METHODS REGARDING DISPUTED TERRITORIES," the entire disclosure of which is incorporated by reference herein.

BACKGROUND OF THE INVENTION

The present invention relates to collecting, storing, and/or using geographic data and, more particularly, to providing geographic or navigation data corresponding to disputed territories.

The use of maps and geographic information are prevalent in today's society. For example, geographic data may be used to navigate to a desired destination, to view an area of interest, to find specific points-of-interest ("POIs"), to educate oneself or others about regions and countries, and/or used for other purposes. Maps and geographic data thereof may be presented in a variety of formats and technologies.

For example, navigation systems or devices may provide useful displays of geographic areas. Navigation devices use map or geographic data, including navigation-related attributes, to provide features, such as map display and map guidance. A navigation device may provide guidance and display for a variety of regions, such as for a city, a state, a country, as well as areas between or including two or more countries.

However, a geographic area may be viewed or recognized differently by separate or different entities. City, state, province, and/or country boundaries or borders as well as associated geographic features or POIs may be in dispute. For example, a country may be represented on a geographic or navigation device having borders or features recognized by one country or entity, but another country or entity may dispute those borders or features and recognize different borders or features. Complexities may arise if one uses the navigation device in both countries or in a country or region that disputes the presentation of the geographic data. Accordingly, systems, methods, and/or techniques to address disputed territories, such as in regards to navigation systems, may be useful.

SUMMARY OF THE INVENTION

According to one aspect, a computer-implemented method of collecting data for a geographic database for use with a navigation system is provided. For example, the method includes identifying a data record that represents at least a part of a geographic boundary. The data record is stored in a geographic database on a computer readable medium. An indication of dispute is assigned to the identified data record. The indication of dispute represents that the identified data record corresponds to a border disputed between a first geographic entity and a second geographic entity. The indication of dispute is stored in the geographic database on the computer readable medium.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
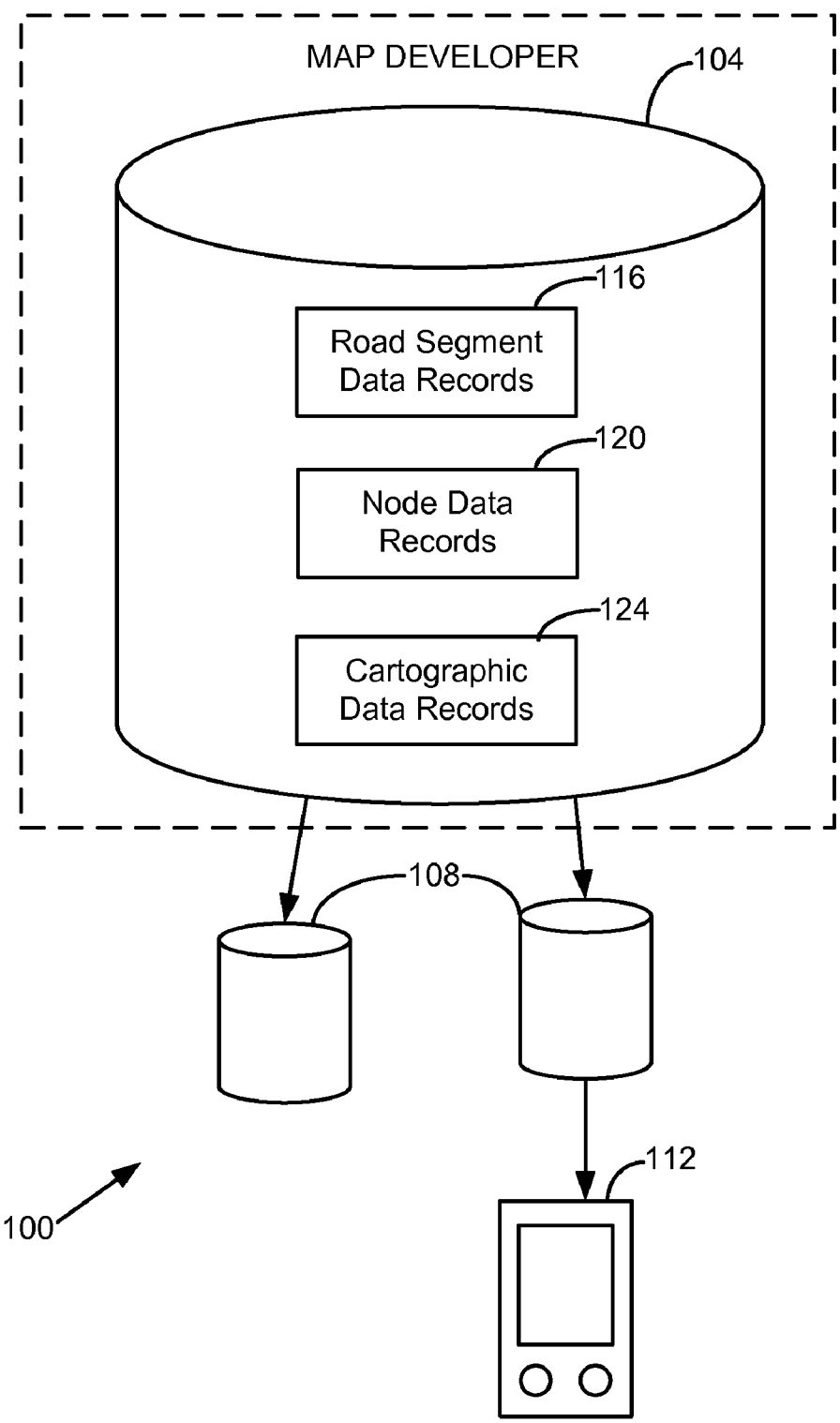
FIG. 1 is a diagram of a geographic data and/or navigation system corresponding to disputed territories.

FIG. 1 shows one embodiment of a geographic data and/or navigation system 100 corresponding to disputed territories. The system 100 includes, but is not limited to, a geographic or navigation database 104, compiled navigation or geographic databases 108, and an end user device 112. Additional, fewer, or different components may be provided. For example, a processor, a server, a base station, transceiver and/or broadcasting components, a router, a switch or intelligent switch, computers or workstations, administrative components, a gateway device, a backbone, ports, network connections and/or components, and network interfaces may be provided.

The map or navigation database 104 may be a master geographic or navigation database that contains data that represent geographic features in a coverage area. The coverage area may correspond to an entire country, such as the United States. Alternatively, the coverage area may correspond to several countries, such as the United States, Canada, Mexico; France, Germany, Italy, Greece, Turkey, Cyprus; Israel, Lebanon, Jordan; India, Pakistan, China; and so on. According to another alternative, the coverage area may represent only a single region within a geographic area, such as a country, state, province, or city.

In one embodiment, the geographic or map database 104 includes data used for navigation-related services. For example, the geographic database 104 includes road segment data records 116, node data records 120, and cartographic ("carto") data records 124. Other data records such as, but not limited to, routing data, maneuver data, and POI data may also be included.

The road segment data records 116 are links or segments representing roads, streets, or paths. The node data records 120 are end points corresponding to the respective links or segments of the road segment data records 116. The road segment data records 116 and the node data records 120 represent a road network, such as used by vehicles, cars, and/or other entities. Alternatively, the geographic database 104 contains path segment and node data records or other data that represent pedestrian paths in addition to or instead of the vehicle road record data.

The road segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, etc. The geographic database 104 may include data about the locations of these POIs. The geographic database 104 may also include data about places, such as cities, towns, or other communities, and other geographic features, such as bodies of water, mountain ranges, etc. Such place or feature data may be POI data or may be associated with POIs or POI data (such as a data point used for displaying or representing a position of a city). The geographic database 104 may include other kinds of information.

The carto data records 124 contain geographic feature information that is used to display image representations (such as maps) of various portions of a geographic region represented by the geographic database 104. The carto data records 124 are links or segments or polygons that represent geographic features other than roads or paths. For example, the links or link segment data records may represent a country boundary or border, a state boundary or border, a province boundary or border, a county boundary or border, a city or township boundary or border, a river, a lake, a landmark, and/or other geographic features. The carto data records 124 may be associated with position or location information, such as geographic coordinates (e.g., latitude, longitude, and/or altitude) as well as with POI data or other data.

In one embodiment, the carto data records 124 contain data related to disputed territories. For example, different disputed country boundaries or other disputed geographic boundaries may be included in the carto data records 124 so that geographic regions or countries may be able to be represented differently based on a certain geographic entity's or country's point of view or acceptance (or the lack thereof) of geographic borders. Also, other disputed geographic features or data may also be included, such as disputed POIs.

The geographic database 104 may be maintained by a map, geographic, and/or navigation data developer, such as NAVTEQ North America, LLC located in Chicago, Ill. The map developer collects geographic data to generate and enhance the database 104. There are different ways used by the map developer to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used. The data collected by the map developer are stored in the geographic database 104.

The master geographic database 104 may be stored in a format that facilitates updating, maintenance, and development. For example, the master geographic database 104 or data in the master geographic database 104 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases 108, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the databases 108 may be performed by a party or entity separate from the map developer. For example, a customer of the map developer, such as a navigation device developer or other end user device developer, may perform compilation on a received geographic database in a delivery format to produce one or more compiled navigation databases 108.

In one embodiment, one or more of the compiled navigation databases 108 may be used with or included in the end user device 112. The end user device 112 is an in-vehicle navigation system, a personal navigation device ("PND"), a portable navigation device, a cellular telephone, a mobile phone, a personal digital assistant ("PDA"), a watch, a computer, and/or other device that can perform navigation-related functions, such as digital routing and map display. In one embodiment, the navigation device 112 is a cellular telephone, such as a cellular telephone provided by Nokia Corporation located in Espoo, Finland. An end user uses the device 112 for navigation functions such as guidance and map display. In one embodiment, the end user may operate the end user device 112 to provide multiple views of a country or geographic region based on disputed borders or boundaries as recognized by the respective geographic entities or countries in dispute. For example, the end user device 112 may display a geographic border of a region as recognized by a first country as well as display a different geographic border of the same region as recognized by a second country yet not recognized by the first country.

Figure 2:
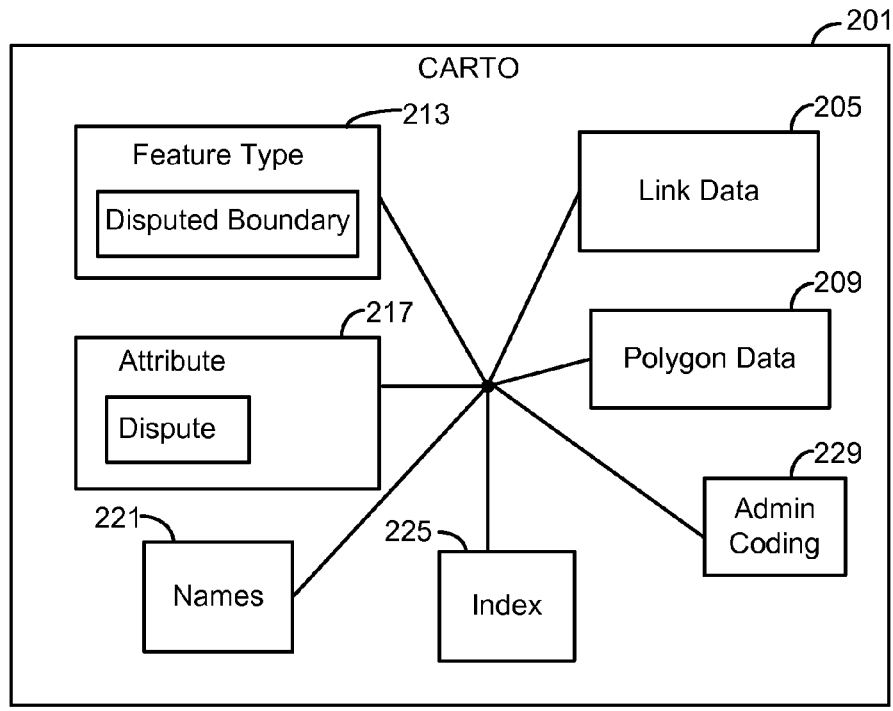
FIG. 2 illustrates data components of a geographic database used in the system of FIG. 1.

FIG. 2 illustrates data components of carto data records 201, which are similar to or the same as the carto data records 124. The carto data records 201 include link data 205, polygon data 209, feature type data 213, attribute data 217, names data 221, an index 225, and administrative coding 229. More, fewer, or different components or data may be provided. Some or all of the carto data records 201 are configured or adapted to be identified, selected, and/or retrieved for data representation or display as well as other functions. While the components in FIG. 2 are shown as separate from one another, one or more of these components may be combined.

The link data 205 include links, segments, or link data records that represent different geographic features. For example, a link or segment record is a linear section that represents a part or portion of a river, lake, boundary or border of a geographic entity or region, and other geographic features. The polygon data 209 include data records representing closed polygons that represent geographic features. For example, a polygon may represent an outline or boundary of a city, lake, landmark, or other geographic feature. In an alternative embodiment, the polygon may be a series of connected links or segments.

The link data 205 and/or the polygon data 209 may be associated with or assigned an indication or designation of dispute. An indication of dispute may be an indicator that can be used to identify or use link or polygon data when presenting disputed territories for different viewpoints or recognitions of disputed areas. The indication may be one or more data bits, data flags, numbers, or other indicator.

In one embodiment, indications or designations of dispute may include the feature type 213 and the attribute 217. Other indications of dispute may also be used. The feature type 213 is a new category, type, or designation used in classifying different types of carto links or polygons. For example, current types may include country border or boundary, state border or boundary, river, etc. The feature type 213 is a new type corresponding to a disputed country border or boundary or other disputed border or boundary. Accordingly, all or some of the links or polygons that represent a border or boundary in dispute are assigned the feature type 213 (a disputed border or boundary type). The disputed feature type 213 may be a code, a numerical representation, binary data, a data flag, or other indicator. In one embodiment, the number sequence or value 907197 is used to represent a disputed country boundary, and the number sequence or value 909997 is used to represent a disputed state boundary. A state may mean different regions depending on the usage. For example, in the U.S., a state is one of the 50 states or controlled area, and in foreign countries, a state may be a province or other geographic entity. The disputed feature type 213 may be used to identify corresponding links when determining to include or exclude the respective border for display.

The attribute or designation attribute 217 corresponds to an attribute of dispute assigned to one or more links or polygons. For example, instead of or in addition to creating new feature types, attributes 217 are used to assign an indication of dispute to a respective carto record. In one embodiment, some or all internationally recognized or accepted borders that are in dispute between multiple countries may be assigned the attribute of dispute 217. For example, a dividing line, accepted by an international entity (such as the United Nations ("U.N.")), between two countries may be assigned the attribute of dispute 217. In this case, the attribute of dispute may be referred to as a line of control or other name. The attribute of dispute 217 or line of control may be used to identify corresponding links when determining to include or exclude the border (such as the dividing line) for display.

The attribute of dispute 217 may also be used or assigned to disputed geographic features, areas, or POIs within borders. For example, rivers, cities, lakes, and/or other geographic features within geographic borders or boundaries may be in dispute between multiple geographic entities. Accordingly, the links or polygons representing these features may be assigned the attribute of dispute 217. For example, a polygon or line segments representing an outline of a city, lake, POI, or other geographic feature within a country or state border may be attributed to be in dispute. In one embodiment, the attribute "claimed by" may be used. Respective links, polygons, or other features in dispute may be associated with the attribute "claimed by" for a specific geographic entity. For example, when map display is requested for a geographic region as recognized or accepted by a geographic entity, the links, polygons, and/or other features associated with the "claimed by" attribute for that geographic entity are identified and retrieved for display.

The attribute of dispute 217 may also include a "controlled by" attribute. The "controlled by" attribute is assigned to links, polygons, or other features representing geographic features within disputed borders that are not "claimed by" an outside country or geographic entity. An international entity, such as the U.N., may recognize a geographic feature (such as a lake or city) to be under the control of one country in a disputed area, but the geographic feature may not be "claimed by" other countries or even the country it is deemed under control by the U.N. This attribute of dispute is used to exclude data for map display. For example, a polygon or line segments representing an outline of a city, lake, or other geographic feature within an area of dispute that is not considered to be a part of a specific country or geographic entity as recognized by that specific country or geographic entity may be attributed with the attribute "controlled by," such as controlled by a different country or entity. When map display is requested for a geographic region as recognized by the specific country or geographic entity, the links, polygons, or points associated with the "controlled by" attribute are identified and/or excluded for display.

The carto data records 201 also include the names data 221. The names data 221 are data representing different names for a specific geographic feature, such as a geographic area, POI, city, lake, river, and/or other geographic feature. For example, if a city is in a disputed area, one country may call or use a name for the city and another country may call or use a different name for the city. Accordingly, the names data 221 corresponds to the different names used for the geographic features in dispute. Also, the names themselves may be considered geographic features. The names data 221 may be a plurality or a sequence of letters or symbols used by respective different geographic entities that are associated or attributed with respective links, polygons, points, or features. The names data 221 may also be POI data. Also, road segments or road data records may be associated with different names regarding disputed areas. For example, one geographic entity may call a road by a name, and another geographic entity may call the same road by a different name.

The index 225 may be one or more indices or data structures that organizes and/or links the different carto data with each other. The administrative coding 229 is a hierarchy used when processing the carto data. The administrative coding 229 may be part of or included with the index 225 or may be separate. For any given geographic region, a hierarchy of administration is associated with it. For example, a town is associated with a county, the county is associated with a state or province, and the state or province is associated with a country. Accordingly, every link or polygon is associated with the administrative coding 229. In one embodiment, the left side and right side of a link or segment (and/or the inside and outside of a polygon) is associated with a hierarchy, such as the lowest admin entity to the highest admin entity. For example, the right side of a link may be in a neighborhood, which is in a city, which is in a county, which is in a state or province, which is in a country. This hierarchy is used to process the carto data for different functions and features as well as maintain an organized data structure.

The administrative coding 229 may be modified or enhanced when dealing with disputed territories. A zone is used as a lowest level in the hierarchy when an area or region is not considered a traditional admin level. For example, Flushing, N.Y. is in Queens, and so a zone may be used to represent Flushing. The zone feature may be used to create an alternative hierarchy for a disputed area. For example, a link may be associated with a border in dispute. From an internationally or U.N. accepted point of view, the right side of the link may have the following hierarchy: a first city, a first state or province, and a first country. However, the zone feature may be used to create an alternative hierarchy. For example, a zone may be associated with the right side of the link, and the zone may be referred to as a disputed area zone. The disputed area zone represents that this link is part of an alternate hierarchy based on the disputed area. Accordingly, the disputed area zone may be used to identify the following alternate hierarchy: a second city, a second state or province, and a second country. Accordingly, when building up the map for the disputed area, the original admin hierarchy may be used to display the area as recognized by the first country, and the disputed area zone may be used to identify the alternate hierarchy to display the area as recognized by the second country. One or more disputed area zones may be used. Also, the disputed area zone may be considered as an indication of dispute.

Figure 3:
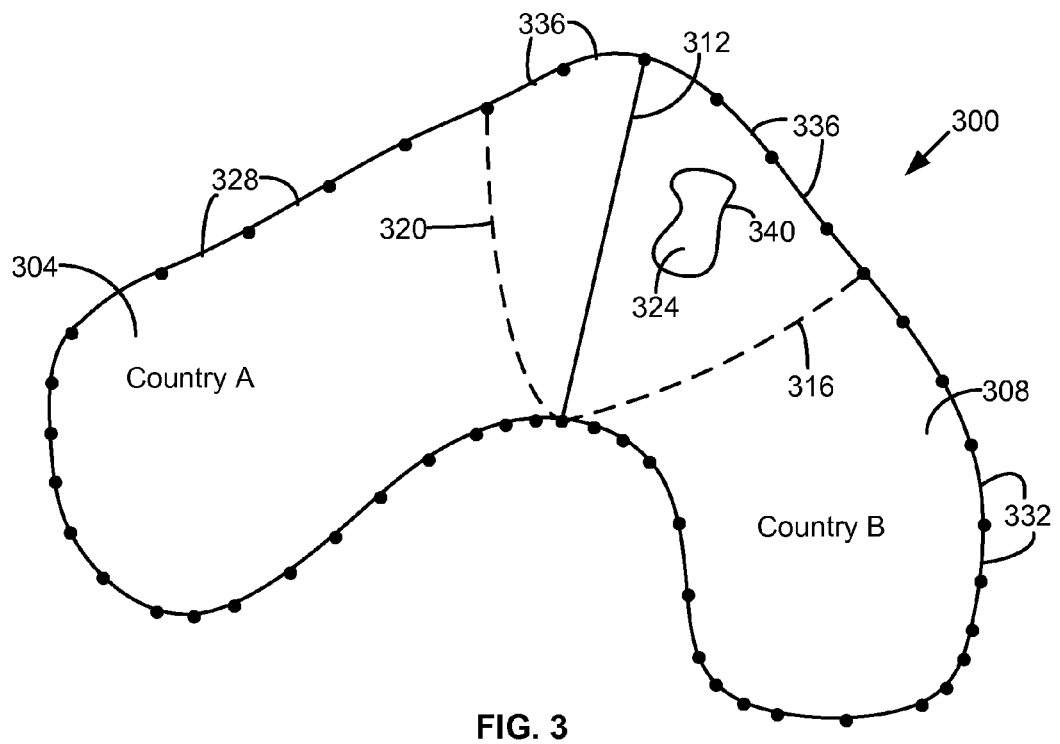
FIG. 3 illustrates a data representation of a geographic area including disputed boundaries.

FIG. 3 illustrates a data representation of a geographic or geographical area 300 including disputed boundaries. The geographic area 300 includes a geographic entity 304 and a geographic entity 308. In one embodiment, the geographic entity 304 is country A and the geographic entity 308 is country B. According to an international body or forum, such as the U.N., country A and country B are divided by border 312. However, country A recognizes or accepts border 316 as the boundary between country A and country B, and country B recognizes or accepts border 320 as the boundary between country B and country A. However, country A does not recognize or accept border 320 as the boundary between country B and country A, and country B does not recognize or accept border 316 as the boundary between country A and country B. More than two geographic entities in dispute and their disputed features may be provided.

To address the disputed area, types and attributes of dispute as well as other data corresponding to disputed areas or features are assigned and stored in the geographic database 104. For example, the line 312 or line segments thereof are attributed with an indication of dispute, such as the line of control attribute. The links corresponding to the border 316 are assigned a disputed country boundary type, such as the feature type 213. The disputed country boundary for the 316 border is associated with country A. In one embodiment, the "claimed by" attribute may be used to associate the disputed country boundary for the 316 border with country A, or the "claimed by" attribute may not be used. The links corresponding to the border 320 are assigned a disputed country boundary type, such as the feature type 213. The disputed country boundary for the 320 border is associated with country B. In one embodiment, the "claimed by" attribute may be used to associate the disputed country boundary for the 320 border with country B, or the "claimed by" attribute may not be used. Also, the links 336 are designated or associated with the disputed country boundary type and/or an attribute of dispute. In one embodiment, the links 336 are shared by both country A and country B. Meaning, the links 336 are used to display or represent country A as recognized by country A (not recognized by country B), and the links 336 are also used to display or represent country B as recognized by country B (not recognized by country A).

The geographic feature or POI 324 (e.g., a city 324 or lake 324) may also be assigned an attribute of dispute, such as the attribute 217. For example, the "claimed by" attribute may be assigned to the polygon or links 340 or point representing the geographic feature 324. The geographic feature 324 may be "claimed by" both country A and country B. In an alternative embodiment, if country A does not recognize the geographic feature 324 as part of country A, the attribute "controlled by" country B may be used to exclude the geographic feature 324 when building the map as recognized by country A.

Also, different names for geographic features in dispute, such as the geographic feature 324, may be assigned, and the administrative coding may be modified or enhanced to include alternate or dispute hierarchies. However, the line segments or links, polygons, or other features not in dispute, such as the links 328 and the links 332, are not altered or attributed. By assigning and using indications of dispute, a geographic area in dispute may be represented or displayed in different ways by recognizing the different borders and features in dispute. Also, this embodiment minimizes redundancy of data by avoiding storage of multiple versions of full map data (such as redundant links) as respectively recognized by different geographic entities or forums. However, storing multiple copies of geographic areas in dispute as recognized by different entities may be utilized.

Figure 4:
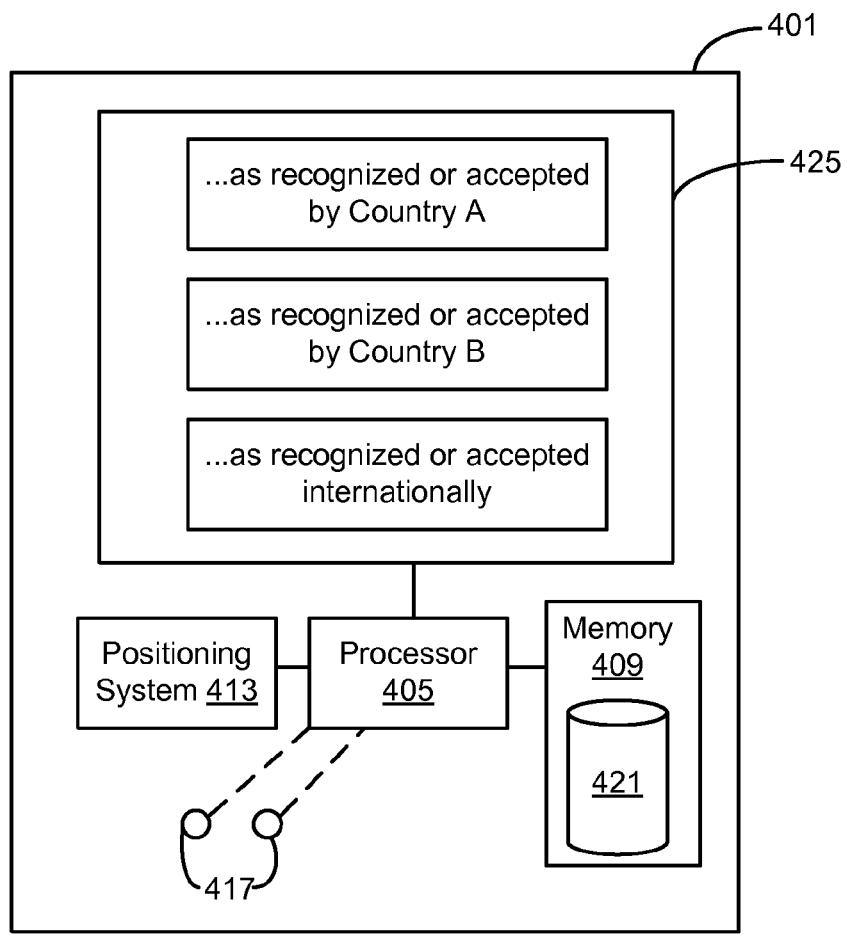
FIG. 4 illustrates one embodiment of a navigation and/or geographic device providing viewing options.

FIG. 4 illustrates one embodiment of a navigation and/or geographic device 401, such as the end user device 112. The navigation device includes, but is not limited to, a processor 405, a memory 409, a positioning system or device 413, input buttons or device 417, and a display or user interface 425. Additional, fewer, or different components may be provided. For example, wireless transmitter and receiver components (such as an antenna) may be provided, and wired connections and ports may be provided. Audio components may be provided as well. While the components in FIG. 4 are shown as separate from one another, one or more of these components may be combined.

The processor 405 is a general processor, application-specific integrated circuit ("ASIC"), digital signal processor, field programmable gate array ("FPGA"), digital circuit, analog circuit, or combinations thereof. The processor 405 may be one or more processors operable to control and/or communicate with the various electronics and logic of the device 401. The processor 405 is configured to execute functions and controls regarding the disputed territory data and logic.

The memory 409 is in communication with the processor 405. The memory 409 is any known or future storage device. The memory 409 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 409 may be part of the processor 405. The memory 409 includes or is in communication with a geographic or navigation database, such as the database 108. The memory 409 may also include a software application corresponding to the logic and functions of providing options and different views of geographic areas in dispute.

The positioning system 413 is also in communication with the processor 405. The positioning system 413 is a global positioning satellite ("GPS") system, one or more mechanical and/or electrical sensors, one or more gyroscopes, a local positioning system, one or more direction sensors, or other system or device for providing position data, such as location data (e.g., longitude, latitude, and/or altitude) and/or direction data, of the device 401. The input device 417 is one or more buttons used to make selections on or input data or commands to the device 401. Other input devices such as a keypad, keyboard, mouse, stylist pen, trackball, rocker switch, touch pad, voice recognition circuit, or other device or component for controlling or inputting data may be used.

The display 425 is also in communication with the processor 405. The display 425 is any mechanical and/or electronic display positioned for accessible viewing in, on, or in communication with the device 401. For example, the display 405 is a touch screen, liquid crystal display ("LCD"), cathode ray tube ("CRT") display, or a plasma display. The display 405 may act as a hardware implementation of a user interface or a portion thereof.

In one embodiment, the display or user interface 425 displays or provides different options on how to view a geographic area in dispute. For example, the display 425 provides a selectable list format option. The options include viewing the geographic area, such as the area 300, as recognized or accepted by country A, as recognized or accepted by country B, or as recognized or accepted internationally (such as by the U.N.). Other options may be provided. For example, viewing country A as recognized by country A or country B, viewing country B as recognized by country B or country A, viewing country A or B as recognized internationally, viewing country A or B or the area with all disputed borders or features as well as internationally recognized borders or features, or a mixture thereof. An end user may select one of the options, such as via a touch screen function or input button, to view the geographic area from the specific point of view or recognition.

Figure 5:
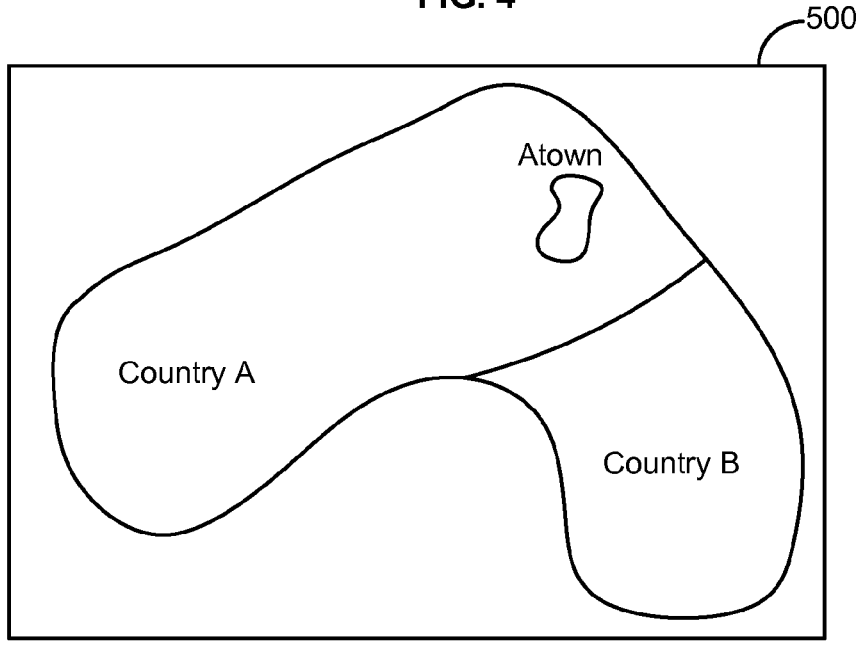
FIG. 5 illustrates a graphical representation of the geographical area of FIG. 3 as recognized by a first geographic entity.

FIG. 5 illustrates a data and/or graphical representation 500 of the geographic area 300 as recognized by country A. For example, an end user selects the option corresponding to viewing the area from the point of view of country A. Accordingly, the links associated with the disputed country border associated with country A are identified and obtained for display. Also, features "claimed by" country A are identified and obtained for display. For example, the geographic feature 324 is displayed as a city in country A. The name "Atown" (recognized by country A but not country B) is retrieved and displayed. In an alternative embodiment, if the geographic feature 324 was attributed with "controlled by" country B, the feature 324 would have been excluded from the display. Furthermore, the line of control attribute is used to exclude the internationally recognized dividing line. All of the links and carto records not in dispute are identified and used as normal. The database 421 is used to identify and obtain respective data records based on the associated attributes or feature types.

Figure 6:
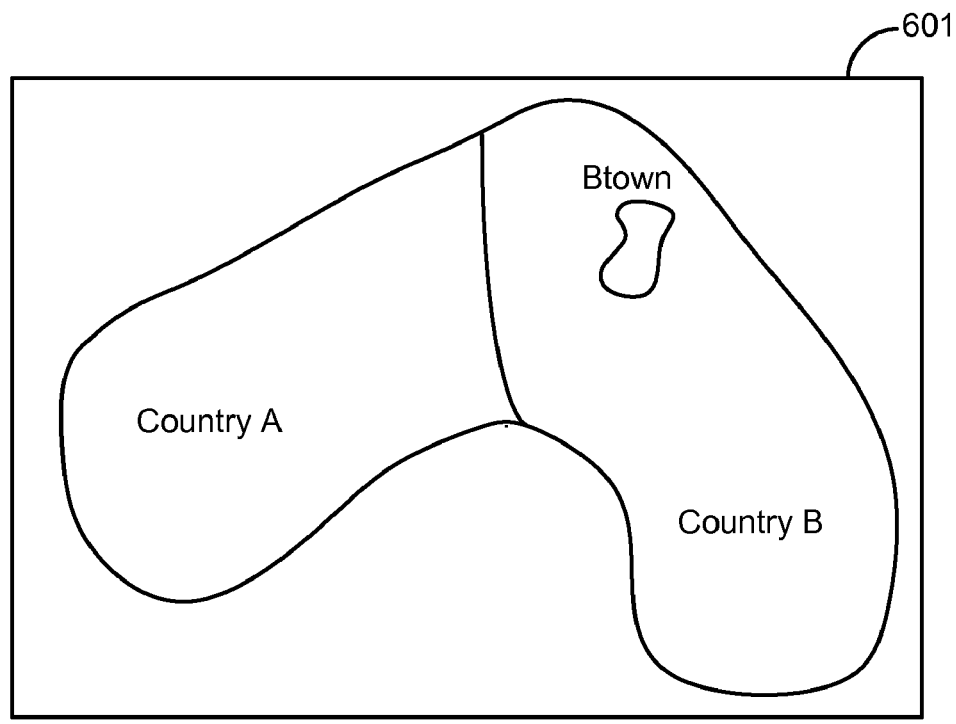
FIG. 6 illustrates a graphical representation of the geographical area of FIG. 3 as recognized by a second geographic entity.

FIG. 6 illustrates a data and/or graphical representation 601 of the geographic area 300 as recognized by country B. For example, an end user selects the option corresponding to viewing the area from the point of view of country B. Accordingly, the links associated with the disputed country border associated with country B are identified and obtained for display. Also, features "claimed by" country B are identified and obtained for display. For example, the geographic feature 324 is displayed as a city in country B. The name "Btown" (recognized by country B but not country A) is retrieved and displayed next to the feature 324. Furthermore, the line of control attribute is used to exclude the internationally recognized dividing line. All of the links and carto records not in dispute are identified and used as normal. The database 421 is used to identify and obtain respective data records based on the associated attributes or feature types.

Figure 7:
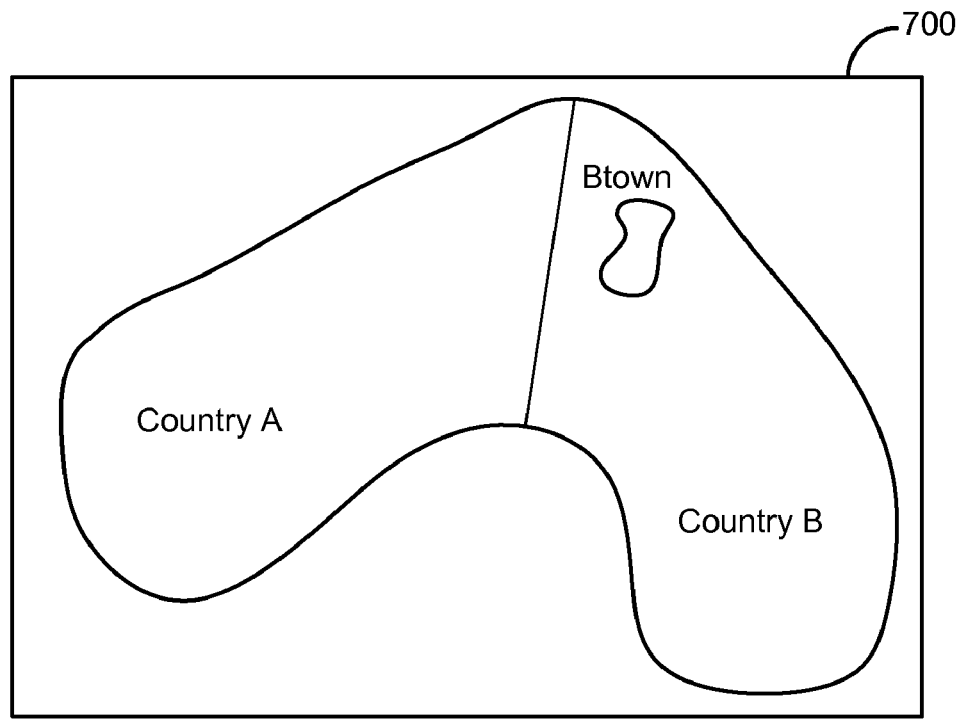
FIG. 7 illustrates a graphical representation of the geographical area of FIG. 3 as recognized by a third party.

FIG. 7 illustrates a data and/or graphical representation 700 of the geographic area 300 as recognized internationally or by an international forum or body, such as the U.N. For example, an end user selects the option corresponding to viewing the area from the point of view of an international forum. Accordingly, the links associated with the disputed country border type are identified and excluded for display. However, the links and geographic features (including name data) that are in dispute (including attributions or indications of dispute) but are also recognized internationally are identified and obtained for display. Furthermore, the line of control attribute is used to include the internationally recognized dividing line. All of the links and carto records not in dispute are identified and used as normal. The database 421 is used to identify and obtain respective data records based on the associated attributes or feature types.

Other displays or options may be provided. For example, a display including all of the disputed borders and internationally recognized borders (such as shown in FIG. 3) may be provided as an option and displayed. Also, disputed borders and features of more than two geographic entities may be generated and displayed (such as a screen shot of an area including three or more geographic entities in dispute). Regarding the different displays, a variety of colors, patterns, highlights, and other features may be used to represent and show the different areas and features in dispute as well as other map graphics.

Alternatively, instead of or in addition to providing different options of viewing to an end user, the device 401 may include a default preference when showing areas in dispute, and an end user may have to manually change the default if desired. For example, the end user may input a preference on how to view geographic areas in dispute. Furthermore, location or position information (as obtained by the positioning system 413) may be used in deciding on how to display a geographic area in dispute. For example, if the device 401 is in country A, then the device 401 may display the geographic area as recognized by country A. If the device 401 is in country B, then the device 401 may display the geographic area as recognized by country B. If the device 401 is in neutral territory or a third country, then the device 401 may display the geographic area as recognized internationally. Also, the location information may be used to disable features. For example, if approaching a border or a dividing line between countries or geographic entities, the current configuration may be disabled and a neutral view of the area may be displayed, or map display may be disabled or turned off.

Figure 8:
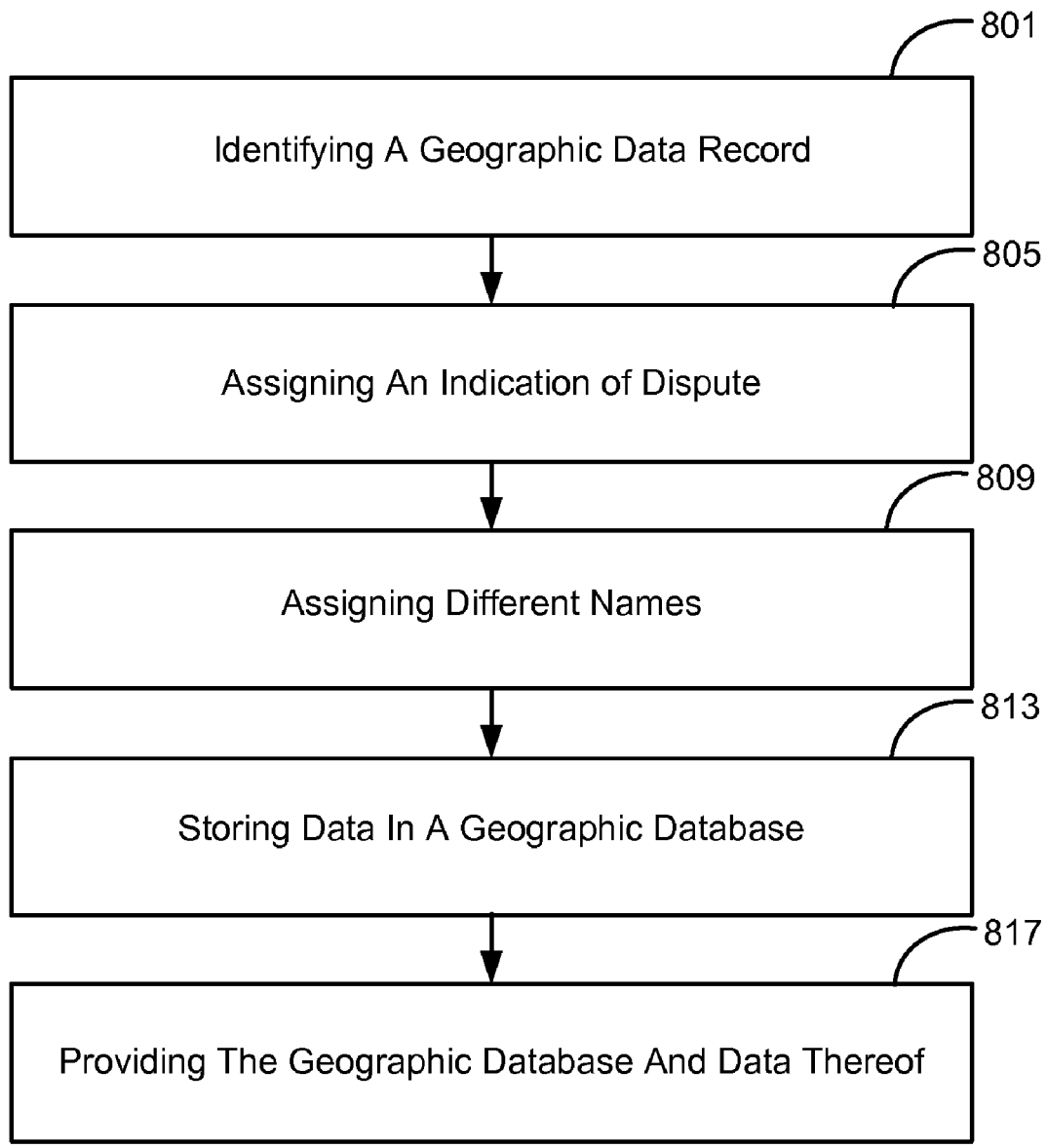
FIG. 8 is a flowchart of a method of collecting data for a geographic database for use with a navigation system.

FIG. 8 is a flowchart of a method, such as a computer-implemented method, of collecting data for a geographic database, such as the database 104, for use with a navigation system. Fewer or more steps or acts may be provided, and a combination of steps may be provided. Also, the steps or acts may be performed in the order as shown or in a different order. The method is implemented by the system and/or devices described herein or by different devices or systems.

In one embodiment, a map developer enhances or generates a geographic database, such as the database 104, with disputed territory features or data. For example, one or more geographic data records, such as carto data records, are identified (Step 801). The map developer or personnel or computers thereof may use manual and/or automated computer techniques to identify data records associated with a disputed area. The data records may be identified within the database 104 or a separate database or file. For example, data records such as links corresponding to boundaries or borders in dispute are identified or selected. Also, links, polygons, or points associated with a feature or POI in an area of dispute are identified.

An indication of dispute is assigned, designated, or allocated to the identified data records (Step 805). For example, some links associated with disputed borders between multiple geographic entities are assigned a feature type or designation type indicating dispute, such as the feature type 213. Also, other links or polygon data or other feature data are assigned an attribute of dispute, such as the attribute 217. For example, "claimed by," "controlled by," and line of control attributes may be assigned. Furthermore, a disputed zone area may be assigned or created to provide alternate hierarchies in administrative coding, such as the admin coding 229, for building up maps for display.

Different name data, such as the name data 221, may be assigned to respective links, polygons, POIs, and/or geographic features (Step 809). For example, a city or other POI or feature may have a different name associated with it depending on what country or geographic entity recognizes or accepts it as part of its authority. Accordingly, different names or letter/symbol sequences may be allocated to a specific geographic region, feature, POI, and/or links or data thereof. The different names are associated with a different geographic entities claiming or recognizing the respective name.

The different names, indications of dispute (such as attributes of dispute, feature types of dispute, and disputed zone areas), and/or other assigned or allocated data are stored in the geographic or navigation database 104 (Step 813). The names, indications of dispute, and other assigned data may be linked or associated with respective links/segments, polygons, or points via an index, such as the index 225, or other data structures or files.

The geographic database and data thereof is provided (Step 817). For example, a delivery format of the database 104 is provided to device manufactures or developers. The database may be provided electronically via wireless and/or wired connections or may be provided in a hardware format, such as in a CD, DVD, or other storage medium. In one embodiment, the device developer compiles the received database to produce a navigation database product, such as the database 108. The compiled database product is used with or included in an end user device, such as the device 112 or the device 401. The device developer may choose to compile the received database to produce a database product that has the option of using different attributes and indications of dispute to generate different representations of geographic areas in dispute. However, the device developer may choose to compile the received database to provide a database product having only one data structure regarding a disputed area in which one will not be able to choose different views of disputed territories. Also, the map developer may provide data of a geographic region to a customer or third party without the option (or data representing the options) to choose different views or representations of disputed territories.

Figure 9:
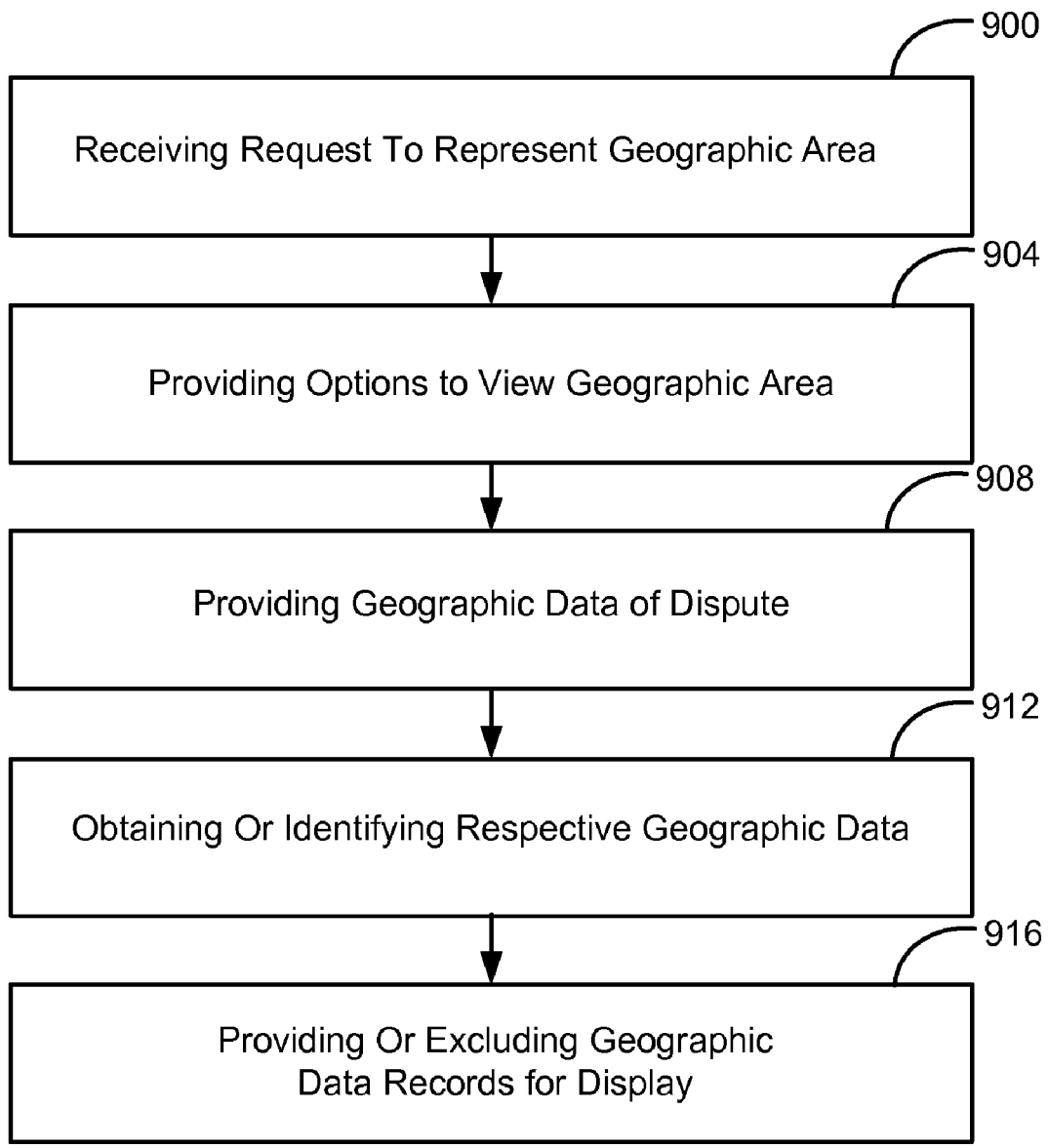
FIG. 9 is a flowchart of a method of operating a navigation system to provide views of disputed territories.

FIG. 9 is a flowchart of a method, such as a computer-implemented method, of operating a navigation system to provide views of disputed territories. Fewer or more steps or acts may be provided, and a combination of steps may be provided. Also, the steps or acts may be performed in the order as shown or in a different order. The method is implemented by the system and/or devices described herein or by different devices or systems.

In one embodiment, an end user uses a device, such as the device 112 or the device 401, to view a map and/or utilize navigation related functions. The end user may have the ability or option to enable or disable a disputed territory viewing feature or application. For example, the end user decides to view, such as for map guidance or display, a geographic area in dispute while a disputed territory feature or application is enabled. The end user device receives a request, such as a data request in response to the end users map guidance or display request, to represent the geographic area in dispute (Step 900).

The end user device provides options to view the geographic area (Step 904). For example, a user interface, such as the user interface 425, of the device shows selectable options icons to choose from. The list of options (as illustrated in FIG. 4) give the end user the option to view the geographic area as recognized by a certain geographic entity or body. The presentation of options may be different, such as using symbols or flags of different countries or entities or having other display options. In an alternative embodiment, a preference entered by the end user may be used instead of a list of options. Also, the device may choose to display the geographic area in dispute as recognized by a certain geographic entity or forum based on the location of the device. Any other feature or option to view the geographic area from different disputed points of view may be used.

The geographic data, such as the carto records and associated indications of dispute and/or other data, corresponding to the geographic area to be displayed are provided (Step 908). For example, the feature type, attribute data, zone data, name data, associated links or polygons, and/or other data may be in a database, such as the database 108 or 421, installed or included in the end user device. Alternatively, the data may be in a server or computer separate from the end user device.

When a specific option or selection to view the geographic area as recognized or accepted by a geographic entity is selected, the respective data is identified or obtained (Step 912). For example, the indications of dispute are used to identify links, polygons, and/or points as well as associated data (such as name data) when determining how to represent the geographic area in dispute. The respective data is identified or obtained from the included database or imported from a separate server or computer via a wireless and/or wired connection or network. The identified or obtained data is provided or excluded for display on the end user device (Step 916). For example, based on the specific feature types, attributes of dispute, name data, disputed zone area, and other indications of dispute, certain links, polygons, points and/or other data (such as text) may be included or excluded when displaying the geographic area as recognized by a certain geographic entity, as illustrated by FIGS. 5-7. As an example, the table below illustrates some logic for inclusion and exclusion of data for representation and/or display.

| | Country(907196) Link with no Line of Control attribute | Country(907196) Link with Line of Control = Y | Disputed Country (907197) |
|---|---|---|---|
| Create a Country product 'A' | Include, with Named Place ID for 'A' | Exclude | Include with Named Place ID for 'A' |
| Create a Country product 'B' | Include, with Named Place ID for 'B' | Exclude | Include, with Name Place ID for 'B' |
| Create a Multi-country product showing disputed border | Include | Include | Include |
| Create a Multi-country product not showing disputed border | Include | Include | Exclude |

Alternatives

In the description above, land borders or boundaries in dispute are focused on in the examples. However, the features discussed above may also apply to boundaries of bodies of water in dispute amongst multiple geographic entities.

Furthermore, some of the examples above concentrate on navigation systems. However, the features discussed above may be used in other systems, such as video game systems and other systems or methods that utilize geographic data.

Other methods and systems may be provided based on the descriptions herein. For example, a product-by-process method may be provided as well as a variety of system embodiments.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A computer-implemented method of collecting data for a geographic database for use with a navigation system, the method comprising:
   identifying a first line segment data record that represents part of a first geographic boundary, the first line segment data record stored in a geographic database on a computer readable medium;
   identifying a second line segment data record that represents part of a second geographic boundary, the second line segment data record stored in the geographic database;
   assigning a designation type to the identified first and second line segment data records, the designation type indicating that the identified first and second line segment data records each represent a line that is considered part of a border disputed between a first geographic entity and a second geographic entity; and
   storing the designation type in the geographic database on the computer readable medium,
   wherein the stored designation type is configured to include the first identified line segment data record as part of a data representation of a border of the first geographic entity that is not recognized by the second geographic entity, and
   wherein the stored designation type is further configured to include the second identified line segment data record as part of a data representation of a border of the second geographic entity that is not recognized by the first geographic entity.

2. The method of claim 1, wherein the first geographic entity comprises a first country and the second geographic entity comprises a second country.

3. The method of claim 1, wherein the first geographic entity comprises a first state or province and the second geographic entity comprises a second state or province.

4. The method of claim 1, further comprising:
   assigning a first name to a point of interest;
   assigning a second name to the point of interest; and
   storing the first name and the second name in the geographic database on the computer readable medium,
   wherein the first name is configured to be selected when including the first identified line segment data record as part of the data representation of the border of the first geographic entity that is not recognized by the second geographic entity.

5. The method of claim 4, wherein the point of interest comprises a city.

6. The method of claim 1, further comprising:
   identifying another line segment data record that represents part of a dividing line between the first geographic entity and the second geographic entity as recognized by a third party entity but not recognized by the first geographic entity or the second geographic entity, the other line segment data record stored in the geographic database on the computer readable medium;
   assigning a designation attribute to the another identified line segment data record, the designation attribute indicating that the another identified line segment data record represents a line that is considered part of a border disputed between the first geographic entity and the second geographic entity; and
   storing the designation attribute in the geographic database on the computer readable medium,
   wherein the stored designation attribute is configured to exclude the first and second identified line segment data records as part of the data representation of the border of the first geographic entity that is not recognized by the second geographic entity.

7. the method of claim 6, wherein the third party entity comprises an international body or organization.

8. A computer-implemented method of collecting data for a geographic database for use with a navigation system, the method comprising:
   identifying a first data record corresponding to a first geographic boundary disputed between a first geographic entity and a second geographic entity, the first data record stored in a geographic database on a computer readable medium;
   identifying a second data record corresponding to a second geographic boundary disputed between the first geographic entity and the second geographic entity, the second data record stored in the geographic database;
   allocating a first indication of dispute to the first data record;
   allocating a second indication of dispute to the second data record;
   storing the first and second indications of dispute in the geographic database on the computer readable medium,
   wherein the first stored indication of dispute is identified when providing a data representation of the first geographic entity that is not recognized by the second geographic entity, and
   wherein the second stored indication of dispute is identified when providing a data representation of the second geographic entity that is not recognized by the first geographic entity.

9. The method of claim 8, wherein the first and second data records represent a first polygon or link and a second polygon or link, respectively.

10. The method of claim 8, wherein the first and second data records represent part of a first country or state border and part of a second country or state border, respectively.

11. The method of claim 8, wherein the first and second data records represent a point of interest.

12. The method of claim 8, wherein the first or second stored indication of dispute is configured to be identified when providing a data representation of the first geographic entity and the second geographic entity as recognized by a third party entity but not recognized by the first geographic entity or the second geographic entity.

13. The method of claim 12, wherein the third party entity comprises an international body.

14. The method of claim 8, wherein the first and second indications each comprise a code, a numerical representation, binary data, or a data flag.

15. The method of claim 8, wherein the first data record represents a point of interest within the first geographic boundary and the second data record represents the point of interest within the second geographic boundary.

16. A computer-implemented method of collecting data for a geographic database for use with a navigation system, the method comprising:
   associating a first name to a geographic data record, the geographic data record stored in a geographic database on a computer readable medium;

associating a second name to the geographic data record, the geographic data record corresponding to a geographic border disputed between a first geographic entity and a second geographic entity; and storing the first name and the second name in the geographic database on the computer readable medium, wherein the first name is selected when using the geographic data record in a data representation of the first geographic entity that is not recognized by the second geographic entity, and wherein the second name is selected when using the geographic data record in a data representation of the second geographic entity that is not recognized by the first geographic entity.

17. The method of claim 16, wherein the geographic data record corresponds to a city within the geographic border, and wherein the first name comprises a plurality of letters representing a name of the city used by the first geographic entity that are not used by the second geographic entity.

18. The method of claim 16, wherein the second name is selected when using the geographic data record in a data representation of the second geographic entity that is not recognized by the first geographic entity.

19. A computer-implemented method of collecting data for a geographic database for use with a navigation system, the method comprising:

identifying a first data record that represents at least a part of a first geographic boundary, the first data record stored in a geographic database on a computer readable medium;

identifying a second data record that represents at least a part of a second geographic boundary, the second data record stored in the geographic database;

assigning a first indication of dispute to the first identified data record and a second indication of dispute to the second identified data record, the first and second indications of dispute representing that the first and second identified data records, respectively, correspond to a border disputed between a first geographic entity and a second geographic entity; and storing the first and second indications of dispute in the geographic database on the computer readable medium, wherein the first stored indication of dispute is identified when providing a data representation of the first geographic entity that is not recognized by the second geographic entity, wherein the second stored indication of dispute is identified when providing a data representation of the second geographic entity that is not recognized by the first geographic entity, and wherein the first geographic entity is a first country, state, province, city, town, or county, and the second geographic entity is a second country, state, province, city, town, or county.

20. The method of claim 19, wherein the first and second data records comprise a first link data record and a second link data record, respectively.

21. A computer-implemented method of collecting data for a geographic database for use with a navigation system, the method comprising:

identifying a first data record that represents a first geographic feature accepted by a first geographic entity but not accepted by a second geographic entity;

identifying a second data record that represents a second geographic feature accepted by the second geographic entity but not accepted by the first geographic entity; and storing the first data record and the second data record in the geographic database, wherein the first data record is identified when providing a data representation of the first geographic entity that is not recognized by the second geographic entity, wherein the second data record is identified when providing a data representation of the second geographic entity that is not recognized by the first geographic entity, and wherein the first and second geographic features represented by the first and second data records respectively comprise at least a part of a first geographic boundary and at least part of a second geographic boundary.

* * * * *